United States Patent [19]

Yates et al.

[11] 4,172,817
[45] Oct. 30, 1979

[54] PROCESS FOR REACTIVATING AN IRIDIUM-CONTAINING CATALYST

[75] Inventors: David J. C. Yates, Bernards Township, Somerset County; Walter S. Kmak, Scotch Plains, both of N.J.

[73] Assignee: Exxon Research & Engineering Co., Florham Park, N.J.

[21] Appl. No.: 907,928

[22] Filed: May 22, 1978

[51] Int. Cl.$^2$ .............................................. C10G 35/08
[52] U.S. Cl. .................................... 208/140; 208/139; 252/415
[58] Field of Search ................. 208/140, 139; 252/415

[56] References Cited

U.S. PATENT DOCUMENTS

| | | | |
|---|---|---|---|
| 3,904,510 | 9/1975 | Simfelt et al. | 208/140 |
| 3,937,660 | 2/1976 | Yates et al. | 208/140 |
| 3,939,061 | 2/1976 | Paynter et al. | 208/140 |
| 3,941,716 | 3/1976 | Paynter | 208/140 |
| 3,969,267 | 7/1976 | McVicker | 208/140 |
| 3,981,823 | 9/1976 | Yates | 208/140 |

Primary Examiner—C. Davis
Attorney, Agent, or Firm—Llewellyn A. Proctor

[57] ABSTRACT

This invention relates to improvements in a process for treating a catalyst, or bed of catalyst, comprised of a composite of an iridium metal or admixture of said metal with other metals, particularly platinum, or admixtures of iridium and platinum with other metals, halogen, and a refractory porous inorganic oxide, notably alumina which has been deactivated by coke deposition thereon, as commonly occurs in a hydroconversion reactions, notably as in upgrading virgin or cracked naphthas in catalytic reforming to produce higher octane products. The time required for reactivation of such catalyst can be shortened by deliberate agglomeration of the iridium, or admixture of iridium and other metal hydrogenation-dehydrogenation components, above about seventy percent, and preferably by essentially complete agglomeration of the iridium, or admixture of iridium and other metal hydrogenation-dehydrogenation components, prior to one or more cycles of sequential reduction/halogenation treatments. The desired high agglomeration of the iridium, or admixture of iridium and other metal hydrogenation-dehydrogenation components, is preferably accomplished by a relatively severe coke burn which not only achieves the desired agglomeration, but also more efficiently and effectively removes the coke from the coked catalyst.

14 Claims, No Drawings

PROCESS FOR REACTIVATING AN IRIDIUM-CONTAINING CATALYST

Catalytic reforming with hydrogen, or hydroforming, is a well established industrial process employed by the petroleum industry for upgrading virgin or cracked naphthas for the production of high octane products. In such process, a multi-functional catalyst is employed which contains a metal hydrogenation-dehydrogenation component, or components, substantially atomically dispersed upon the surface of a porous, inorganic oxide support, notably alumina. Noble metal catalysts, notably of the platinum type, are currently employed, reforming being defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins to produce gas and coke, the latter being deposited on the catalyst.

The activity of the catalyst gradually declines in reforming due to the build-up of carbonaceous deposits, or coke, on the catalyst. During operation, the temperature of the process is gradually raised to compensate for the activity loss. Eventually, however, economics dictates the necessity of reactivating the catalyst. Consequently, in all processes of this type the catalyst must necessarily be periodically regenerated by burning off the coke at controlled conditions. In the regeneration, the coked catalyst is contacted with oxygen at flame front temperatures ranging about 425° C.–540° C., followed by a secondary burn with increased oxygen concentrations as coke is depleted from the catalyst. Maximum temperatures can range up to the sintering temperature of the catalyst, generally to about 595° C. or 650° C. Higher temperatures should not be permitted for an extended period. Precise control, however, is difficult particularly since, while incomplete removal of the coke deposits is acceptable in some cases, it is generally preferred to remove substantially all of the burnable coke from the catalyst. Despite the care taken with the burning operation, the burn generally causes some agglomeration of the metal with loss of surface area and this, in turn, produces a substantial loss of catalyst activity. Accordingly, reactivation of a catalyst generally includes an initial regeneration by coke burn off, with subsequent metals redispersion. For example, a deactivated platinum-containing catalyst is first regenerated by burning the coke from the catalyst as a result of which the platinum contained on the catalyst is agglomerated with loss of metal surface area. The agglomerated platinum metal is then redispersed to a fine state of dispersion, with relative ease, by treatment with chloride or other halogen-containing reagent, generally used in admixture with oxygen at elevated temperatures to increase the rate of redispersion. Techniques useful for the reactivation of platinum-containing catalysts are disclosed, e.g., in U.S. Pat. Nos. 3,134,732 and 3,625,860.

Techniques useful for the redispersion of platinum, however, are not directly applicable for the redispersion of iridium, or iridium in admixture with other metal hydrogenation-dehydrogenation components. Unlike platinum, iridium tends to agglomerate to crystallites of low surface area when exposed to oxygen at temperatures in excess of about 370° C., especially above about 425° C. Moreover, unlike platinum, large iridium and iridium oxide crystallites are not readily redispersed to their high surface area state by a simple halogen treatment immediately following the burning operation. Only recently have techniques been developed by virtue of which iridium, or iridium in admixture with other metal hydrogenation-dehydrogenation components, can be redispersed to a high surface area state. This is accomplished by subjecting the catalyst, after removal of the carbonaceous deposits, to one or more sequential reduction/halogenation cycles. Generally, a plurality of reduction/halogenation cycles are required to completely redisperse the iridium, or iridium in admixture with other metal hydrogenation-dehydrogenation components, upon the support. Such techniques are disclosed, e.g., in U.S. Pat. Nos. 3,937,660; 3,941,682; 3,941,716; 3,943,052; and 3,981,823.

Due to the difficulties associated with redispersing the iridium, or iridium in admixture with other metal hydrogenation-dehydrogenation components, the oxygen concentration, temperature and halogen content of the gas and catalyst are presently controlled such that a maximum of about seventy weight percent of the iridium is agglomerated to relatively large or massive crystals whose sides (length of a side of an assumed cubic crystallite) are greater than about 50 A (Angstrom units), as measured by X-ray or chemisorption techniques. (For description of chemisorption techniques, refer to Journal of Catalysis, 8, 348, 1967 by D. J. C. Yates and J. H. Sinfelt.) By limiting the amount of agglomeration it was believed that the full activity of catalysts could be restored without undue extension of the time and difficulty required for the reactivation of catalysts whose activity had been substantially lowered as a result of the loss of metals dispersion on the surface of the catalyst support. The time and difficulty of effective redispersion of the metals upon the surface of a support is obviously an important consideration in the commercial operation of a reforming unit, particularly when considering the consequences of lost production.

It is, accordingly, an object of the present invention to provide a new and novel process for reactivation of catalysts which are comprised of iridium, or iridium as a component of a multimetallic composition, particularly one which includes an admixture of both iridium and platinum, or an admixture of platinum and iridium with other metal hydrogenation-dehydrogenation components, which has become deactivated by contact with hydrocarbon feeds inclusive, also of additional deactivation, if any, caused by burning coke from coked catalysts.

A specific object is to provide a new and novel reactivation process which minimizes the extent, or duration of the treatments required in reactivating the coked catalysts, particularly reforming catalysts, and returning same to a state of activation approximating that of a fresh catalyst.

These objects and others can be achieved in accordance with the present invention embodying a process based on the discovery that the time required for reactivation of said catalyst, or bed of said catalyst, can be shortened, by deliberate agglomeration of the iridium, or admixture of iridium and other metal components, above seventy percent, and preferably by essentially complete agglomeration of the iridium, or admixture of iridium and other metal components, prior to one or more cycles of sequential reduction/halogenation treatments. The desired high agglomeration of the iridium, or admixture of iridium and other metal components, is preferably accomplished by a more severe coke burn which not only achieves the desired agglomeration, but also more efficiently and effectively removes the coke from the coked catalyst.

In a preferred mode of operation, accumulated coke deposits are removed from a coked catalyst, or bed of catalyst, by burning with an oxygen-containing gas, or gases, at a temperture in excess of about 455° C., and preferably from about 485° C. to about 650° C., but below the sintering temperature of the catalyst. A bed of the coke-depleted catalyst wherein the iridium of the catalyst is agglomerated above seventy weight percent, and preferably from about 90 weight percent to about 100 percent, to crystallites having sides (assumed cubic crystallite) greater than about 50 A, is contacted in a plurality of cycles, a single cycle of which includes, in sequence, (i) contact of the coke-depleted catalyst with a reducing gas, preferably a stream of hydrogen or hydrogen-containing gas, at temperature and time sufficient to reduce a substantial portion of the iridium, or admixture of iridium and other hydrogenation-dehydrogenation components, and (ii) contact of the reduced catalyst with a gas comprising halogen, or halogen precursor, preferably chlorine, which may or may not include significant concentrations of added molecular oxygen, at temperature sufficient to redisperse the agglomerates and reduce their average crystallite size. Preferably, after the redispersion, the metal, or metals, of the catalyst, inclusive of iridium, is atomically dispersed, or the average size of the crystallites after redispersing are no more than about 12 A.

It is essential that the coke-depleted catalyst, after reduction in any given cycle, not be contacted with a substantially halogen-free, oxygen-containing gas at temperature sufficient to further agglomerate the iridium on the catalyst prior to the halogen treat step. In effecting redispersion of the metal, or metals, of the catalyst during halogen treatment, it is necessary to maintain the halogen or halogen-containing gas, at a temperature of at least about 300° C. to obtain significant redispersion.

The first step in the reactivation sequence, pursuant to the practice of this invention, consists of regenerating the coke depleted iridium-containing catalyst subsequent to its use in a hydrocarbon conversion reactor (reaction zone), typically a reformer (reforming zone). The coke depleted, iridium-containing catalyst is treated with oxygen or an oxygen-containing gas, to burn off at least a portion of the accumulated coke. The regeneration is carried out at a temperature of at least about 455° C., preferably at a temperature ranging from about 485° C. to about 550° C. Time and temperature, however, are interrelated and consequently longer time periods can be utilized to obtain higher agglomeration at relatively low temperatures and, conversely, higher temperatures can be utilized for shorter periods of time to obtain high agglomeration. In a more preferred operation, the coke residue is removed from the catalyst by contacting same with oxygen contained in minor concentrations within an inert gas, normally flue gas, so as to maintain a flame front temperature ranging from about 400° C., to about 600° C., preferably from about 485° C. to about 550° C. Oxygen concentrations in the burning gas are generally maintained between about 0.1 and about 2 mole % in order to maintain the desired flame front temperatures. Following completion of the burn, the catalyst may undergo an aftertreatment operation at temperatures ranging from about 485° C. to about 550° C. with a burning gas containing oxygen in a concentration of from about 0.3 mole % to about 21 mole %.

Following the burning operation, it is highly desirable that the carbonaceous residue depleted catalyst be contacted with an inert gas, preferably nitrogen, to purge from the reaction zone any residual carbon monoxide, carbon dioxide and oxygen. The purging operation can be accomplished by a continuous purge sweep or by evacuating the reaction zone containing the catalyst and then pressurizing the chamber with nitrogen. Alternatively, the zone may be pressurized with nitrogen and then depressurized.

Following the purging operation, if used, the catalyst is subjected to a plurality of reduction/halogenation cycles in order to redisperse the iridium catalyst components, that is to increase the iridium surface area of the catalyst to a level greater than about 200 m²/gm. This surface area level corresponds to an iridium particle size (length of a side of an assumed cubic crystallite) of less than about 11 A.

The reduction step is accomplished by contacting the carbonaceous residue depleted catalyst with hydrogen or a hydrogen-containing gas at a temperature ranging between about 200° C. and about 550° C., preferably between about 350° C. and 550° C. Preferably, the hydrogen-containing gas comprises hydrogen contained in nitrogen and the gaseous admixture is substantially free of sulfur, phosphorous compounds, or other catalyst poisons. Contact of the catalyst with the hydrogen-containing gas is carried out for a time sufficient to convert at least a portion, preferably a substantial portion, of the iridium contained in the catalyst to its metallic or elemental form. The pressure within the contact zone during the time of reduction may vary from about 0.1 to about 30, preferably from about 5 to about 20, atmospheres. If a purge is employed following the coke burning operation, the hydrogen-containing gas is introduced into the reaction zone while the catalyst is at the relatively low temperatures used in the purging operation. Thereafter, the catalyst temperature is raised to the level desired in the halogenation step by contact with high temperature hydrogen-containing gas.

Following the reduction operation, the catalyst which has a substantial portion of the iridium contained thereon in the metallic (elemental) form is contacted with an elemental halogen-containing gas, preferably a chlorine-containing gas at a temperature of at least about 300° C. Preferably, the contacting of the catalyst with the halogen-containing gas is conducted at a temperature varying from about 300° C. to about 600° C. Most preferably, the temperature of contacting with the halogen-containing gas is carried out at a temperature varying from about 420° C. to about 550° C. It is preferred that the plurality of reduction/halogenation cycles needed to redisperse the iridium catalyst component be completed without reducing the temperature of the catalyst below about 400° C. The reaction zone pressure during the halogenation operation is preferably maintained between about 0.1 and about 30 atmospheres, preferably between about 5 and about 20 atmospheres. Desirably the halogen employed in the treating operation is used in admixture with an inert gas, preferably nitrogen. Most preferably, the concentration of the halogen in the treating gas mixture is relatively low, that is, the halogen comprises from about 0.005 to 5% by volume of the gaseous mixture with about 0.02 to about 1.0% by volume being the most preferred concentration. The contacting of the catalyst with the halogen-containing gas is generally continued for a time sufficient to incorporate from about 0.1 to about 4.0 wt. %, preferably from about 0.5 to about 2.0 wt. %, additional halogen onto the catalyst, based upon the anhydrous weight of the catalyst. Generally, from a corrosion standpoint, it is desirable not to continue the halogen treating operation longer than necessary beyond the point where chlorine is detected in the gases issuing from the zone containing the catalyst in concentrations approximating the halogen concentration of the inlet gases. While elemental halogen, preferably chlorine or fluorine and, most preferably, chlorine, is a necessary constituent of the treating gas, other materials may be present in the treating gas mixture. For example, the treating gas may contain water, hydrogen halides, oxygen, and the like. The required halogen may be injected into the reaction zone containing the catalyst as such or may be generated in situ by the thermal or oxidative degradation of materials containing halogen. For example, chlorine may be generated by the in situ oxidation of hydrogen chloride, similarly, chlorine can be generated by the thermal and/or oxidative degradation of $C_1$-$C_4$ chlorinated hydrocarbons such as carbon tetrachloride, trichloroethylene, ethylene dichloride, t-butyl chloride, etc.

Though, as suggested, the halogen-containing treating gas may contain water and/or oxygen, the concentration of oxygen and/or water in the halogen-containing treating gas should be carefully controlled. The molar ratio of oxygen to elemental halogen in the treating gas should be maintained below about 10:1. Preferably, equal molar quantities of oxygen and halogen or a molar excess of halogen (oxygen to halogen molar ratio of 1:1 or less) is used in the treating operation. The presence of water in the chlorine-containing treating gas is beneficial since its presence serves to reduce corrosion and aids in the distribution of the halogen through the catalyst bed being treated. However, the presence of excessive amounts of water in the treating gas serves to unnecessarily wet the catalyst and possibly strip halogen from the catalyst. Preferably, the water concentration of the treating gas is maintained at levels ranging from about 0.005 to about 10.0%, preferably from about 0.02 to about 1.0% by volume of the total treating gas.

After completion of the initial hydrogen reduction/halogen treating steps following removal of carbonaceous residues, the catalyst is again subjected to additional reduction/halogen treating cycles. Generally from 1 to 6 additional cycles are used in order to completely convert the iridium present in the catalyst to a metallic surface area greater than about 200 $m^3$/gm. Because of the tendency of iridium to agglomerate into low surface area clusters, the use of multiple reduction/chlorine treating cycles following carbonaceous residue removal is normally necessary to secure substantially complete redispersion of the iridium contained on the catalyst.

The regeneration process of the present invention is generally carried out in situ, i.e., the catalyst being treated is maintained within the reactor vessels in which the hydrocarbon conversion reactions are carried out. However, the catalyst may be regenerated ex situ, or in a separate zone. Typically, the regeneration sequence is started by discontinuing contacting the catalyst with feed stock and the reaction vessels purged of hydrocarbons using techniques well known to those skilled in the art. Thereafter, nitrogen is circulated through the reactors at elevated temperature and oxygen slowly introduced into the circulating nitrogen stream in order to burn carbonaceous, or coke residues from the catalyst. As previously described, oxygen, carbon monoxide and carbon dioxide are purged thereafter from the system and hydrogen is introduced into the circulating nitrogen gas stream. After the iridium oxide present on the catalyst has been substantially reduced to metallic iridium through contact with hydrogen, the introduction of hydrogen into the circulating nitrogen gas is discontinued and elemental chlorine is introduced into the circulating stream. Initially the chlorine reacts with the minor amounts of hydrogen remaining in the circulating stream to form hydrogen chloride. After the remaining hydrogen is consumed, the catalyst comes into contact with elemental chlorine. Oxygen and/or water may be introduced into the circulating chlorine-containing gas. If desired, the hydrogen may be purged from the reaction zone by passing an inert gas through the reaction zone prior to the introduction of the elemental halogen. Following the initial chlorine treat, the reduction/halogenation sequence is repeated at least one additional time, generally from two to three additional times, in order to completely redisperse the iridium present in the catalyst. Desirably, the elemental halogen is purged from the reaction zone using an inert purge gas prior to the reintroduction of the hydrogen-containing gas.

It is preferred that the various steps of the regeneration process following the initial reduction operation be completed and the catalyst returned to use without contacting the catalyst with a substantially halogen-free, oxygen-containing gas at a temperature sufficient to further agglomerate the iridium on the catalyst, e.g., above about 370° C. to about 600° C. High temperature oxygen contacting during the course of the regeneration prcedure may diminish the effectiveness of the operation by further agglomerating the iridium on the catalyst. It is preferred that the steps of the regeneration procedure be carried out in sequence. However, the catalyst may be subjected to various other treating operations during or between the reduction/halogenation steps of the regeneration procedure. Such treating operations should not convert any substantial portion of the iridium to a crystalline oxide form or otherwise convert any substantial portion of the iridium and/or support to a state that would preclude the successful regeneration of the catalyst following the procedures hereof.

Another preferred embodiment of the present invention involves reversing the direction of flow of the halogen-containing gas with each reduction/chlorination cycle, the halogen-containing treat gas may be introduced into the top of each reactor containing the catalyst and passed downwardly over the catalyst. In the second cycle the halogen-containing gas is introduced into each reactor at the bottom thereof and passed upwardly over the catalyst. In the third cycle, halogen reagent is again introduced into the top of each reactor. Utilizing this mode of operation, substantially complete redispersion of the iridium is accomplished with a lesser number of cycles than where the flow direction of the treating gases is maintained constant with each cycle.

Following the final contacting of the catalyst with a halogen-containing gas, the catalyst is treated with hydrogen and returned to use without further contact with a halogen-free, oxygen-containing gas at a temperature in excess of about 370° C. Prior to use, the catalyst is sulfided.

The invention, and its principle of operation, will be more fully understood by reference to the following examples.

EXAMPLE 1

Two catalysts, Catalysts 1A and 1B, were prepared and subjected to various treatments and analyses to provide specimens of known agglomerate concentration. Catalyst 1A was further employed as a stock for the further preparation of Catalysts 1C, 1D and 1E.

One hundred grams (100 gms.) of gamma alumina (in the form of 1/16 inch extrudates) was contacted with a solution containing both iridium and platinum salts in quantity sufficient to provide a final catalyst which contained on a dry basis 0.3% iridium and 0.3% platinum, by weight. In such preparation, a first solution was prepared by taking 150 ml. of distilled water and adding to it 3 ml. of a chloroiridic acid solution containing 0.1 gm. of iridium (Ir) per ml. of solution and 3 ml. of chloroplatinic acid containing 0.1 gm. of platinum (Pt) per ml. of solution. The alumina was added to this solution and left for several hours at room temperature. After removing the excess water, the catalyst was dried in air at 110° C. for 16 hrs., and then at 250° C. for 3 hrs.

A five gram portion of this stock was used in the preparation of Catalyst 1A. The specimen was charged to a Pyrex glass flow cell, the air removed from the cell, and pure hydrogen passed through the cell at 500 ml./minute. The sample was the reduced in hydrogen for 1 hr. at 500° C. Full details of the apparatus and procedures used can be found in the published literature (D. J. C. Yates, W. F. Taylor and J. H. Sinfelt, J. Am. Chem. Soc., 86,2996, 1964 and D. J. C. Yates and J. H. Sinfelt, J. Catalysis, 8,348, 1967.) After CO chemisorption isotherms had been run, it was found that both metals were fully dispersed, and every metal atom was in the surface of the catalyst. The equivalent particle size of the crystallites was thus 11.6A.

A second catalyst, Catalyst 1B, was prepared as follows. A portion of the stock used to prepare Catalyst 1A was charged to a furnace and heated in air at 760° C. for 48 hrs. This temperature accelerates the agglomeration of both metals on the support.

A five gram portion of Catalyst 1B was then charged to the adsorption apparatus, and reduced as detailed above for Catalyst 1A. Very much less carbon monoxide was found to be adsorbed, and the average metal particle size was found to be 300 A. Essentially all of the iridium and platinum contained on this catalyst is thus found to be agglomerated into crystallites greater than 50 A. The methods herein used for determining the degree of metals dispersion and surface area of the crystallites by use of X-ray techniques, and CO chemisorption for both Catalysts 1A and 1B are described in U.S. Pat. No. 3,937,660, herewith incorporated by reference.

A third catalyst, Catalyst 1C, was prepared as follows: A portion of the stock used to prepare Catalyst 1A was charged to a furnace and heated in air to 540° C. for 18 hours. Subsequent to this treatment, all of the iridium on the catalyst was found by analysis as iridium oxide present in large particles (greater than 50 A), with none of the iridium metal of size sufficient to be detected by X-ray diffraction (i.e., greater than 50 A). None of the platinum was detected as large particles by X-ray diffraction.

A fourth catalyst, Catalyst 1D, was prepared as follows: A portion of the stock used to prepare Catalyst 1A was charged to a furnace and heated in air to 445° C. for 18 hours. Subsequent to this treatment, X-ray diffraction showed that sixty percent of the iridium was present as iridium oxide particles greater than 50 A.

A fifth catalyst, Catalyst 1E, was prepared as follows: A portion of the stock used to prepare Catalyst 1A was charged to a furnace and heated in air to 435° C. for 16 hours. Subsequent X-ray diffraction analysis showed that forty percent of the iridium was present as iridium oxide particles greater than 50 A.

EXAMPLE 2

The experiments were conducted in a 1 in. diameter Inconel tubular reactor, 36 ins. long. Five catalyst beds were arranged in the tube by the use of plugs of quartz wool, so that the catalyst beds could be removed separately after the experiment, and examined by X-ray analysis. The beds numbered 1, 3 and 5 were charged with 10 grams each of partially agglomerated catalyst, i.e., Catalyst 1D, and beds 2 and 4 consisted of 10 grams each of completely agglomerated catalyst, i.e., Catalyst 1C. Bed number 1 is the inlet bed, and bed number 5 the exit bed. Quartz wool was inserted upstream of bed 1 to act as a preheater for the incoming gas. None of the gases exiting from the reactor were recirculated to the inlet of the reactor.

The tests were conducted in the following sequence of steps:
(1) The catalysts were heated from room temperature to 510° C. by passage through the reactor of a gaseous mixture comprised of 20% $H_2$, 80% He, at a total pressure of 6.8 atmospheres (100 psig).
(2) After reaching 510° C., the gas was wetted so that it contained 0.15% $H_2O$. Injection of the wet gas was continued overnight at 510° C. All subsequent steps were conducted at 510° C.
(3) The next day the $H_2$ flow was cut out, and the flow of wet He was continued for an additional 15 minutes.
(4) Chlorine was added to provide a gaseous mixture comprised of 0.25% $Cl_2$, 0.15% $H_2O$, with the balance He. The flow was held at this level for 15 minutes after chlorine was detected at the exit of the bed.
(5) The chlorine was then purged out with 0.15% $H_2O$ in He, injection being for a period of 15 minutes.
(6) Hydrogen was then added to make the gas composition 0.5% $H_2$, 0.15% $H_2O$, balance He. The flow of gas was held for 25 minutes.
(7) The hydrogen was then cut out, and the wet He flow continued for 15 minutes.
(8) Repeat of Step 4.
(9) Repeat of Step 5.
(10) Repeat of Step 6.
(11) Repeat of Step 7.
(12) Repeat of Step 4.
(13) Dry He was then introduced into the reactor, and the catalyst was then rapidly cooled to room temperature, the catalyst discharged, and examined by X-ray diffraction.

The average Ir agglomeration of the three catalyst beds containing Catalyst 1D was now found to be 9%;

the average agglomeration of the two beds containing Catalyst 1C was found to be 4%. In other words the 60% agglomeration of 1D was reduced to 9% (or 85% redispersion), while the 100% agglomeration of 1C was reduced to 4% (or 96% redispersion). Clearly, the fully agglomerated catalyst was redispersed to a higher degree than the partially agglomerated sample (96% vs. 85%), showing the unexpected superiority of the present invention.

EXAMPLE 3

Example 2 was repeated with fresh catalyst charges, the only difference being that in Step 4, a gaseous mixture comprised of 0.25% $Cl_2$, 0.25% $O_2$, 0.15% $H_2O$, with the balance being He was introduced into the reactor.

Catalyst 1D was reduced from 60% Ir agglomeration to an average of 27%, or 55% redispersion. Catalyst 1C was reduced from 100% Ir agglomeration to an average of 12%, or 88% redispersion. This shows an even greater benefit for a redispersion process starting with 100% Ir agglomeration.

EXAMPLE 4

Example 2 was repeated in all details except that Catalysts 1C and 1E were used.

Catalyst 1E was reduced from 40% agglomeration to an average of 14%, or 65% redispersion. Catalyst 1C was reduced from 100% Ir agglomeration to an average of 10%, or 90% redispersion. Again, at a different level of partial agglomeration, a large benefit is shown by using a fully agglomerated iridium catalyst before redispersion of the metals.

Catalysts useful in the practice of the present invention are those such as heretofore described, and such as used in hydrocarbon conversion processes, particularly reforming, or hydroforming, processes, e.g., a reforming process wherein a mixture of feedstock and hydrogen-containing gas is passed through a catalyst bed, or beds, where the reforming reactions are carried out at temperatures ranging from about 425° C. to about 565° C., total pressures ranging between about 5 and 50 atmospheres, hydrogen partial pressures ranging between about 4 and 40 atmospheres, recycle rate ranging from about 2000 to 15,000 SCF/Bbl, and an hourly weight space velocity between about 0.5 to 8. Within these ranges of conditions, the satisfactory catalyst life before regeneration or reactivation becomes necessary is dictated by economics and is variable with the severity of the imposed reforming conditions. Under mild conditions, the catalyst can function for months without serious decline in properties, while under more severe conditions, especially at lower hydrogen partial pressures, the satisfactory catalyst life per cycle can be as little as a few days.

The metal hydrogenation-dehydrogenation component, or components, is composited with a suitable base, and is employed in concentration ranging preferably from about 0.01 percent to about 10 percent, and more preferably from about 0.1 percent to about 2 percent, based on the total weight of catalyst composition. The metallic components, where two or more metals are employed, are employed in molar ratios ranging from about 1:10 to about 10:1 and more preferably in molar ratios ranging from about 1:2 to about 2:1, a composition comprising iridium with a second metal, e.g., platinum, in molar ratio of 1:1 having been found particularly satisfactory.

The hydrogenation-dehydrogenation component, or components, can be associated or composited with the porous refractory inorganic oxide by various methods known to the art. Where there is more than one component, the several components can be disposed on the porous inorganic oxide in intimate admixture with each other by a suitable technique such as ion exchange, coprecipitation, impregnation, and the like. It is not necessary that the components be incorporated onto the porous inorganic oxide support by the same technique. One component can be composited with the porous inorganic oxide by one method such as, for example, coprecipitation, and the other component associated with the porous inorganic oxide by another technique, i.e., impregnation. Furthermore, the components can be composited with the porous inorganic oxide either sequentially or simultaneously. It is generally preferred that the components be associated with the porous inorganic oxide by impregnation, either sequentially or simultaneously.

The metal, or metals, can be added in essentially any soluble form of the respective metal, or metals, together in the same solution or in sequence as, e.g., soluble salts, acids or other form of compounds. For example, iridium or platinum, or both, can be incorporated with a porous inorganic support in intimate admixture therewith by any suitable technique such as ion exchange, coprecipitation, impregnation, or the like. It is not essential that separate metal components be incorporated onto the porous inorganic oxide by the same technique. One metal, e.g., iridium can be associated with the porous inorganic oxide by one method, e.g., coprecipitation, and the other component, e.g., platinum, by another technique, e.g., impregnation, or vice versa. To incorporate, e.g., platinum onto a porous inorganic oxide support, impregnation with chloroplatinic acid is preferred but other platinum group compounds can be used such as ammonium chloroplatinates, polyamine platinum salts, platinum chloride, and the like. Iridium is also suitably incorporated onto a support with chloroiridic acid, ammonium or potassium salts of iridium, and the like. Other metal promoters, e.g., other Group VIII metal components, tin, tungsten, iron, rhenium, lead, germanium, and the like, can also be incorporated onto a porous inorganic oxide with iridium, or iridium and platinum, in similar manner.

Suitably, mildly or moderately acidic refractory oxides are employed as supports, e.g., silica, silica alumina, magnesia, thoria, boria, titania, zirconia, various spinels, and the like, including in particular alumina which is preferred. High surface area catalysts, or catalysts having surface areas ranging upwardly from about 50 square meters per gram (B.E.T. Method) are preferred. In particular, catalysts having surface areas ranging from about 100 to about 250 square meters per gram, and higher, prove quite satisfactory.

In formation of the more active catalysts, refractory inorganic oxides of desired particle size distribution, in dry state, can be contacted, admixed, or otherwise incorporated with a metal-containing solution, or solutions, and thereby impregnated. The refractory inorganic oxide can thus be pilled, pelleted, beaded, or extruded, alone or in admixture with other materials, and dried and crushed to form particles of desired size. The material can then be treated by contact with a solution containing the desired amount of metal, or metals, or treated sequentially by contact with a solution containing one metal and then the other, in the desired amounts. On the other hand, larger particles can be so-treated and then crushed to the desired size. The particulate mass, in either instance, can be dried and calcined, and contacted with hydrogen, generated in situ or ex situ, to reduce the salt. Suitably, also, the catalyst composite can be formed by adding together suitable reagents such as salts of a metal, or metals, and ammonium hydroxide or ammonium carbonate, and a salt of alumina such as aluminum chloride and aluminum sulfate to form aluminum hydroxide. The aluminum hydroxide containing the salts of the metal, or metals, can then be heated, dried, and simultaneously converted to alumina and/or further impregnated with a metal, or metals, if desired. The material can then be calcined and then hydrogen-treated, in situ or ex situ, to reduce the salts and complete the formation of the catalyst composite.

Essentially any petroleum or hydrocarbon fraction containing paraffins, naphthenes, and the like, can be reformed and the catalyst regenerated. A suitable feed, e.g., a naphtha, either virgin or cracked, Fischer-Tropsch or mixtures thereof, is contacted at reforming conditions in the presence of hydrogen with a catalyst composite including the support which contains catalytically active amounts of iridium or admixtures of iridium and platinum, or iridium with other metals, including particularly mixtures of such metals with other metals. Typical feed stream hydrocarbon molecules are those containing from about 5 to about 12 carbon atoms, or more preferably from about 7 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 volume percent of paraffins, both normal and branched, which fall in the range of about $C_5$ to $C_{12}$, and 5 through about 20 volume percent of the desirable aromatics falling within the range of from about $C_6$ to $C_{12}$.

It is apparent that various other modifications and changes can be made without departing the spirit and scope of the invention.

Having described the invention, what is claimed is:

1. In a process for the catalytic conversion of hydrocarbons wherein a hydrocarbon feedstock is contacted with a catalyst comprising an atomically dispersed iridium component composited with a refractory porous inorganic oxide support at conversion conditions, the catalyst having been at least partially deactivated during contact with said feedstock by the deposition of coke deposits thereon, and thereafter the bed of said catalyst is contacted with a gaseous mixture containing oxygen at an elevated temperature for a time sufficient to burn a substantial portion of said coke deposits therefrom, the iridium component having been agglomerated, and the iridium component then redispersed upon the support by treatment in one or more cycles of sequential reduction/halogenation steps, the reduction step being characterized as one wherein the agglomerated catalyst is contacted with reducing gas at an elevated temperature for a time sufficient to reduce a substantial portion of said iridium on said catalyst to its metallic form, and the redispersion step as one wherein the reduced catalyst, which has a substantial portion of the iridium contained thereon in metallic form, is then contacted with a halogen-containing gas at a temperature of at least about 300° C., the improvement comprising burning the coke off the deactivated catalyst by contact with the oxygen-containing gaseous mixture at temperature and time sufficient to agglomerate above seventy weight percent of the iridium to relatively large crystals whose sides (length of a side of an assumed cubic crystallite) are greater than about 50 Angstrom units, as measured by X-ray or chemisorption techniques, prior to said treatment of said coke depleted catalyst in one or more cycles of sequential reduction/halogenation steps.

2. The process of claim 1 wherein the oxygen containing gaseous mixture contains from about 0.1 mole percent to about 2 mole percent of oxygen, the temperature of the catalyst ranges from about 400° C. to about 600° C.

3. The process of claim 1 wherein the oxygen containing gaseous mixture contains from about 0.3 mole percent to about 1 mole percent of oxygen, the temperature of the catalyst ranges from about 455° C. to about 550° C.

4. The process of claim 1 wherein the coke is burned from the catalyst by contact with the oxygen-containing gaseous mixture at temperature and time sufficient to agglomerate from about 90 percent to about 100 percent of the iridium.

5. The process of claim 4 wherein the oxygen containing gaseous mixture contains from about 0.3 mole percent to about 1 mole percent of oxygen, the temperature of the gaseous mixture ranges from about 485° C. to about 550° C.

6. In a process for the catalytic reforming of hydrocarbons wherein a hydrocarbon feedstock is contacted with a catalyst comprising from about 0.01 to about 3.0 wt. % of an iridium component and a halogen component composited with a refractory inorganic oxide support at reforming conditions, the catalyst having been at least partially deactivated during contact with said feedstock by coke deposition thereon, a method for reactivating said catalyst after discontinuing contact of said catalyst with said feedstock comprising, (i) contacting said coked catalyst in a reaction zone with a gaseous mixture containing oxygen at an elevated temperature of at least about 455° C. for a time sufficient to burn at least a substantial portion of coke from said catalyst, and agglomerate seventy weight percent, and higher, of the iridium to relatively large crystals whose sides (length of a side of an. assumed cubic crystallite) are greater than about 50 Angstrom units, as measured by x-ray or chemisorption techniques;

(ii) contacting said coke-depleted catalyst in a reaction zone with a hydrogen-containing gas at an elevated temperature for a time sufficient to reduce at least a portion of said iridium on said catalyst to its metallic form;

(iii) contacting said reduced catalyst, which has at least a portion of the iridium contained thereon in the metallic form, in said reaction zone with an elemental halogen-containing gas at a temperature of at least about 300° C. for a time sufficient to redisperse at least a portion of the iridium on said catalyst;

(iv) contacting said catalyst in a reaction zone with a hydrogen-containing gas at an elevated temperature for a time sufficient to convert a further portion of said iridium on said catalyst to its metallic form; and (v) contacting said reduced catalyst, which has at least a portion of the iridium contained thereon in the metallic form, in a reaction zone with a halogen-containing gas at a temperature of at least about 300° C. for a time sufficient to further redisperse iridium on the catalyst.

7. The process of claim 6 wherein said step (i) is contacted at a temperature ranging between about 400° C. and 600° C.

8. The process of claim 6 wherein said steps (ii) and (iv) are conducted at a temperature varying from about 350° C. to 550° C.

9. The process of claim 6 wherein said steps (iii) and (v) are conducted at a temperature varying from about 300° C. to 600° C.

10. The process of claim 6 wherein the halogen contacting gas of said steps (iii) and (v) contains oxygen, the molar ratio of oxygen to elemental chlorine in said chlorine containing gas being less than about 10:1.

11. The process of claim 6 wherein said catalyst comprises, in addition to said iridium component, from about 0.01 to about 3.0 wt. % of a platinum component and from about 0.1 to about 3.0 wt. % of a chlorine component contained on an alumina support.

12. The process of claim 6 wherein, after steps (ii) and (iv) but prior to conducting steps (iii) and (v), the catalyst is contacted with an inert purge gas for a time sufficient to remove substantially all of the hydrogen present in said reaction zone and, after step (iii) but prior to conducting step (iv), said catalyst is contacted with an inert purge gas for a time sufficient to remove substantially all of the halogen-containing gas present in said reaction zone.

13. The process of claim 6 wherein the hydrocarbon reforming process is naphtha reforming.

14. The process of claim 6 wherein steps (ii), (iii), (iv) and (v) are repeated, in sequence, until such time as the surface area of the iridium metal present on the catalyst is at least 200 m$^2$/gm.

* * * * *